July 11, 1939.  K. A. BROWNE  2,165,448

TURBOSUPERCHARGER

Filed Feb. 19, 1937  2 Sheets-Sheet 1

INVENTOR.
KENNETH A. BROWNE
BY
ATTORNEY.

July 11, 1939.    K. A. BROWNE    2,165,448
TURBOSUPERCHARGER
Filed Feb. 19, 1937    2 Sheets-Sheet 2

INVENTOR.
KENNETH A. BROWNE.
BY
ATTORNEY.

Patented July 11, 1939

2,165,448

UNITED STATES PATENT OFFICE 2,165,448

TURBOSUPERCHARGER

Kenneth A. Browne, Ridgewood, N. J., assignor to Wright Aeronautical Corporation, a corporation of New York Application February 19, 1937, Serial No. 126,669

4 Claims. (Cl. 230—116)

This invention relates to improvements in turbo-superchargers of the type adapted for use in aircraft power plants. Such apparatus, which is generally known in the art, comprises a casing connected with the exhaust system of the engine and provided with an annular series of nozzles which direct exhaust gas against the cup-shaped blades of a turbine wheel. The shaft on which the turbine wheel is mounted carries a supercharger impeller which, with the associated diffuser, boosts the pressure of atmospheric air which is fed to the intake system of the engine. The rotating system, comprising the turbine wheel, the impeller and the common shaft, rotates at a very high speed, the speed being variable by means of a waste gate control in the engine exhaust system, so that varying degrees of supercharge may be selectively utilized.

The rotating system is preferably of the lowest possible weight, but must be of sufficient strength to withstand the high stresses due to its high speed rotation. In high speed mechanisms of this character, the problem of displacing the critical speeds from the normal operating speed range is an important one, since, if the natural period of vibration of the rotating system lies within the operating speed range of the assembly, the rotating system is liable to vibrate to destruction. If the design is carried out with a very stiff and heavy support system, the shaft system with its support, will have a high natural period, and if this natural period lies within the operating speed range, it is further necessary to have the dynamic balance of the rotating system at the highest degree of perfection if the mechanism is to be expected to operate satisfactorily.

This invention overcomes the need for such extreme perfection in balance by making the shaft supporting system relatively flexible whereby the critical speed of the shaft system is very low—below its normal operation range. Thus, in starting and stopping, the shaft system may pass through the critical range whereat it may take up some degree of vibration, but the frequency will be so low that the vibration will not be destructive. The mechanism with which this invention is particularly concerned operates at from 12,000 to 30,000 R. P. M. The arrangement of the invention permits of a critical speed for the rotating system of about 3,000 R. P. M., so that the ratio between critical speed and operating speed varies from 1:4 to 1:10. If the rotating system is slightly out of balance with these ratios, the stresses imposed upon the shaft supporting system and upon the shaft will be very small and, in fact, virtually negligible. In fact, it is believed that a turbine wheel mounted according to the invention may lose one or two blades from its periphery without setting up destructive vibration in the system.

A further object is to so organize the supporting system for the rotating system that the frequency of synchronism between the natural vibration of the shaft system with the frequency of the exciting impulses is of such a low order that the resonance will have no harmful effects; an associated object is to so construct the mechanism that the frequency of resonance is far below the normal operating range of the mechanism.

Further objects of the invention are to provide a turbine wheel for a turbo-supercharger which will be stronger and lighter than the turbine wheel conventionally used.

Still another object is to provide a cooling system for the turbine wheel adapted to operate with no extraneous parts which might otherwise tend to increase the weight of the system.

A further object is to provide a turbine wheel construction wherein the turbine blades are carried by individual spokes which are formed to induce cooling air flow therebetween.

Still another object is to provide a turbine blade construction wherein the blades are endowed with circumferential restraint with respect to one another without adding the undesirable weight and structure commonly necessary due to conventional bucket or blade closures.

Further objects will be apparent from a reading of the subjoined specification and claims, together with an examination of the accompanying drawings, in which similar numbers indicate similar parts, and in which:

Figure 1:
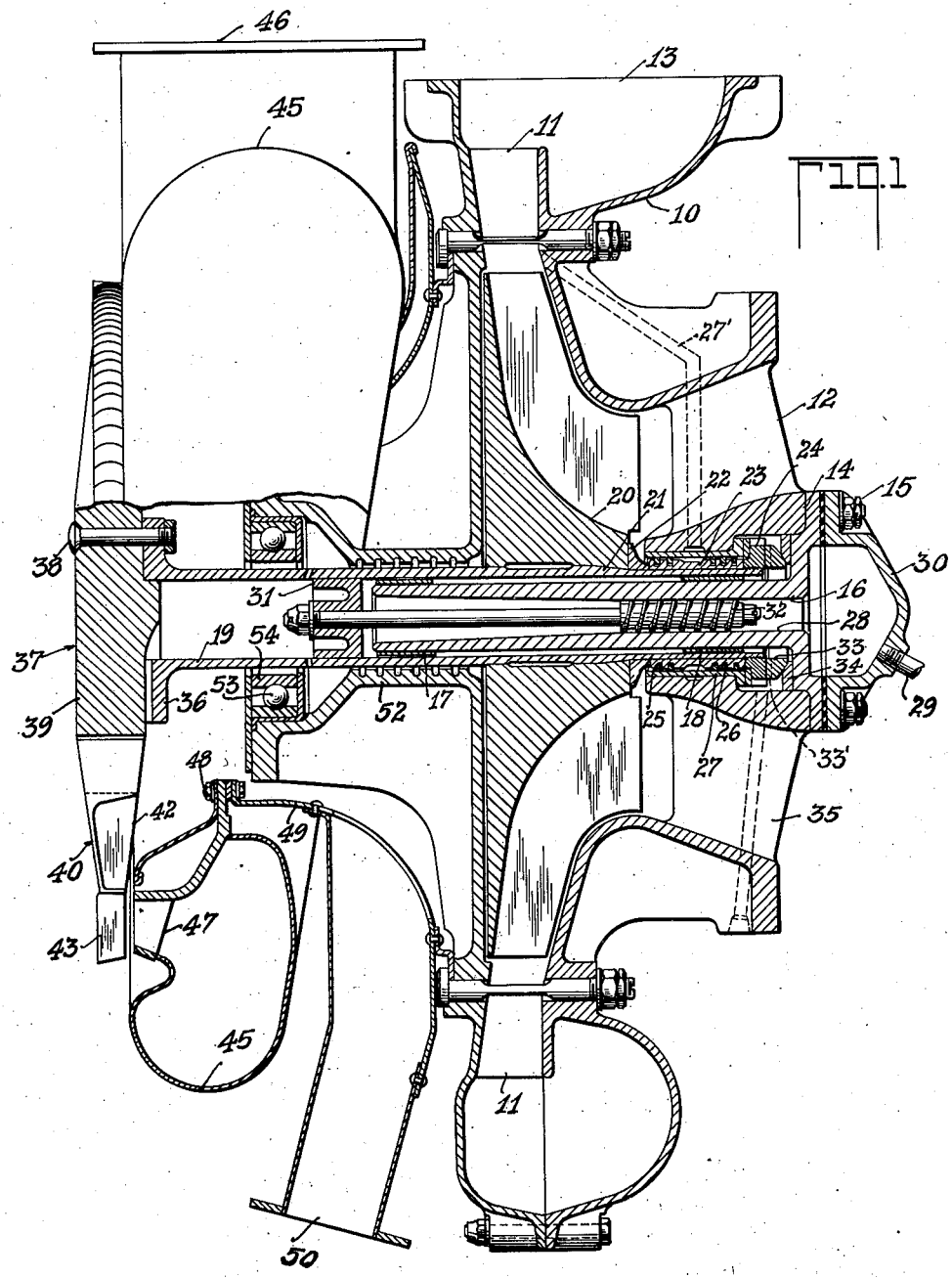
Fig. 1 is an axial section through a turbo-supercharger unit involving the principles of the invention.

Referring to Fig. 1, I provide a supercharger housing 10 equipped with an annular diffuser 11, having an air inlet 12 and an air outlet 13, the latter being arranged for connection to the intake system of an engine. The central part of the housing 10 is formed with a face 14 upon which is bolted at 15 an arbor 16 which projects inwardly as a cantilever shaft within the housing 10. The shaft is provided with bushings 17 and 18 upon which is rotatably mounted a hollow shaft 19 extending axially beyond the end of the arbor 16. A supercharger impeller 20 is fixed to the shaft 19 by virtue of a taper 21, a bearing washer 22, a spacer 23 and a nut 24, the spacer 23 being provided with annular grooves 25 within which are seated seal rings 26 bearing externally upon a bushing 27 fitted in the housing 10. Said bushing, at its right hand end, provides an abutment against which a portion of the nut 24 engages for the axial location of the shaft 19 with respect to the housing 10. The arbor 16 has a through passage 28 communicating at its right hand end with an oil duct 29 fitted into a cap 30 which is attached to the housing 10. Lubrication of the bearings comprising the bushings 17 and 18 is effected by feeding lubricant through the duct 29 which passes through the passage 28, whereupon by virtue of a plug 31 fixed within the hollow of the shaft 19, the oil is retained and is forced to flow reversely over the bushings 17 and 18. To augment the flow of lubricant, or at least to keep a reasonable lubricant pressure upon said bushings, the plug 31 is provided with a screw pump element 32 fitting within the passage 28. As the shaft 19 rotates, oil is forced to the left, as shown, by virtue of the element 32 acting as a friction type of oil pump.

In operation, the thrust on the shaft 19 tends to act toward the right, as shown in Fig. 1, and accordingly, the right hand face of the nut 24 is formed as a thrust face which bears upon the thrust face of an element 33 which, at its right hand surface, is spherically formed to engage a spherically cupped washer 34 bearing upon the housing. The spherical elements 33 and 34 provide for perfect alignment of the thrust bearing in operation. The element 33 is provided with a passage 33' to permit of oil flow to the region of the sealing rings 26 for their proper lubrication. Undue leakage of oil is prevented by the rings 26, and the space between the sets of rings 25 and 26 is vented to the pressure side of the supercharger as at 27'.

At its left hand end, the shaft 19 is provided with a flange 36 upon which a turbine wheel 37 is bolted as at 38.

Figure 2:
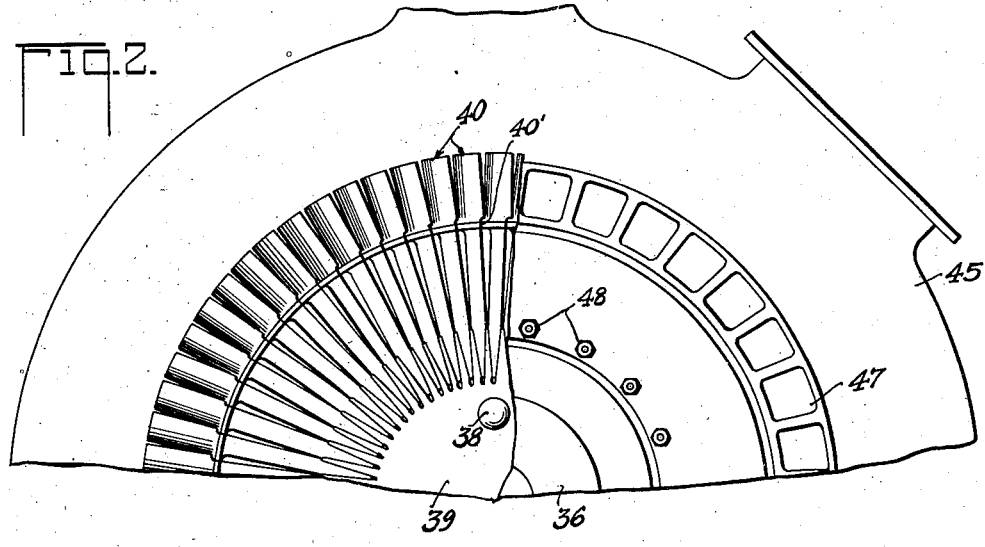
Fig. 2 is a fragmentary end view of the turbine end of the turbo-supercharger, showing in part, the turbine wheel, and showing in part, the nozzle box and nozzle organization.
Figure 3:
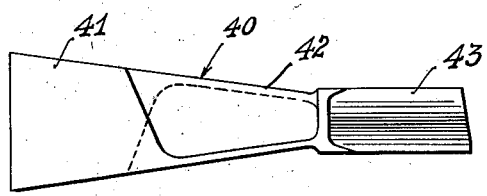
Fig. 3 is an elevation of one of the turbine blade-carrying spokes.
Figure 4:
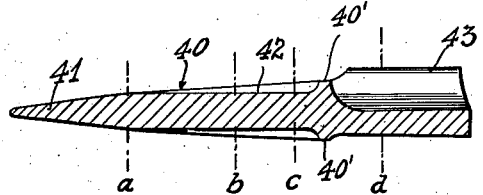
Fig. 4 is a section through the spoke and blade unit.
Figure 5:
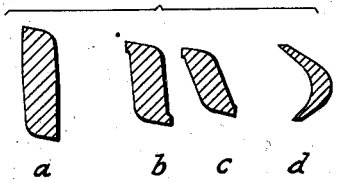
Fig. 5 shows sections $a$, $b$, $c$ and $d$, on the lines $a$, $b$, $c$ and $d$, respectively, of Fig. 4.

This wheel comprises a hub 39 having a plurality of equally circumferentially spaced, reentrant tapered slots formed throughout the periphery thereof, and in each of these slots is fitted and brazed a blade unit 40 having an inner wedge-shaped end 41 adapted for fitting engagement in one of the tapered slots of the hub 39. The central portion 42 of the unit 40 comprises a spoke carrying, at its outer end, a turbine blade 43. The central portion 42, as shown in Fig. 5, is formed to simulate the shape of a fan or propeller blade, and adjacent spokes are slightly spaced from one another, as shown in Fig. 2. Acocrdingly, the assembly of all of the spokes or units 40 provides a fan or blower inwardly of the assemblage of turbine blades 43. The wheel 37 overlies a nozzle box 45 provided with an exhaust entrance opening 46 and a nozzle ring 47 having a plurality of nozzles directing exhaust gas against the turbine wheel blades 43.

Between the pitched spoke 42 and the turbine blade 43, shoulders 40' are formed, each shoulder being organized for abutment with the shoulder 75 of the next adjacent blade unit. Accordingly, the several blades are circumferentially restrained by these abutments and likewise serve as an annular partition in the wheel to divorce the turbine blades 43 from the pitched spoke portions 42. This construction presents an advantage over normal turbine construction, in that each turbine blade 43 is integral with the supporting spoke and accordingly has high beam strength to resist bending loads and possible failure. In prior constructions, the conventional practice provided for a circumscribing ring around the outer ends of the turbine blades to offset bending stresses in the blade, which extra part, with its resultant increase in centrifugal loading on the wheel, is entirely eliminated.

Due to the fact that the material of the blades and spokes cannot be absolutely homogeneous, and since the blades and spokes are bound to stretch radially under the action of centrifugal force, the perfect balance of the wheel may gradually become upset due to operation. In turbine wheels of the prior art, where the wheel was hung on a rigid supporting structure, such stretching of the turbine wheel elements resulted in an eccentric loading on the shaft which augmented the vibration thereof. However, stretching of the blades in the wheel of this invention will have no major detrimental effect, since the slightly eccentric loading induced thereby will permit the wheel to run truly about its own center of gravity due to the flexible shaft supporting system previously described.

As shown in Fig. 1, the nozzle box 45 is formed as an annulus bolted at 48 to an air duct structure 49, in turn attached to the housing 10. Said air duct provides a central air passage having an air entrance 50, whereby air may flow through the passage 50, through the structure 49, to be discharged through the central part of the turbine wheel comprising the central spoke portions 42. Thereby, the turbine wheel is provided with adequate cooling, and the cooling air passing through the structure 49 likewise serves to keep this part of the structure from undue temperature elevation.

The housing 10 is extended within the structure 49 as at 52, and carries a bearing 53, the inner race 54 of which is normally in spaced relation with respect to the shaft 19. This bearing ordinarily does not function except when, upon starting of the turbo-supercharger, the shaft 19 may pass through a low R. P. M. critical point where synchronism occurs between the natural vibration frequency of the shaft system and the speed of rotation. At such time, the shaft may whip at relatively low frequency and contact the bearing race 54, the latter preventing undue displacement of the shaft. However, after such a critical speed has been passed, the shaft 19 will run with true concentricity by virtue of its relatively flexible suspension by the arbor 16 at all speeds within the normal operating range of the turbo-supercharger.

Since the frequency of shaft systems may be readily ascertained either by calculation or experiment, it should appear obvious that the relatively flexible shaft suspension by virtue of the cantilever arbor 16 will have a naturally low vibration frequency so that, as the shaft rotates at high speed in response to the high speed exhaust impulses exerted upon the turbine wheel, no resonant effect will occur.

It might here be noted that in older types of turbo-superchargers, the shaft system was supported in axially spaced rigid bearings, whereby the natural vibration frequency of the shaft system was relatively high and occurred within a speed range at which useful work was being accomplished by the turbo-supercharger. Accordingly, resonant effects flowed from the old structure resulting in objectionable vibration at operating speeds. With the subject organization, such organization, such objections are eliminated.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. A mounting of low inherent vibration frequency for a variable speed shaft, whereby resonance between the shaft and mounting may be eliminated except at low speeds of the shaft, comprising a support, and a non-rotating arbor mounted as a cantilever thereon, said arbor being relatively resilient due to its cantilever support, said shaft being hollow and journalled upon said arbor, and a guide bearing in said support, normally out of engagement with said shaft but subject to engagement thereby at such times as said shaft may be subject to high amplitude low frequency vibration.

2. In a turbo-supercharger including a turbine nozzle box axially spaced from supercharger housing, a resilient cantilever arbor fixed at one end to said housing and extending therethrough toward said nozzle box, a stiff hollow shaft journaled at spaced-apart points on said arbor and extending beyond the housing and nozzle box, a turbine wheel, on the hollow shaft end, adjacent said nozzle box, a supercharger impeller on said hollow shaft between said spaced-apart journals, said impeller lying within said housing, and an outboard bearing in the housing, between the hollow shaft end and the arbor end, having clearance relation with said hollow shaft during normal rotation.

3. In a shaft mounting for a turbo-supercharger unit, a supercharger housing including a bored boss, a cantilever arbor extending therewithin in clearance relation to the bore and fixed to said boss, a hollow shaft journaled on said arbor at spaced apart points and partially filling said clearance, means adjacent said boss for locating said hollow shaft axially relative to the housing, and driving and driven members carried by the shaft, said hollow shaft extending beyond the arbor and carrying one of said members at its extended end.

4. In a shaft mounting for a turbo-supercharger unit, a supercharger housing, a fixed cantilever shaft extending from one wall thereof, a hollow shaft journaled on said fixed shaft, means adjacent said wall for axially locating the hollow shaft relative thereto, said means incorporating a seal to prevent leakage to or from the housing, a boss on said housing, axially spaced from said fixed shaft, having an opening through which said hollow shaft passes, and a bearing fitted to said opening having, normally, clearance relation relative to said hollow shaft, said bearing being active to limit large excursions of said shaft due to vibration.

KENNETH A. BROWNE.